Patented Dec. 22, 1942

2,305,920

UNITED STATES PATENT OFFICE 2,305,920

COATING COMPOSITION

Rudolf Endres, Dessau-Rosslau, Germany; vested in the Alien Property Custodian

No Drawing. Application January 24, 1940, Serial No. 315,319. In Germany May 23, 1936

9 Claims. (Cl. 106—176)

This invention relates to an improved coating composition comprising cellulose derivatives and tetrahydrofurfuryl esters of certain mono-carboxylic acids, and is a continuation-in-part of my copending application Ser. No. 143,757, filed November 20, 1937, now Patent No. 2,191,428.

It is an object of the instant invention to provide improved coating compositions and plastic masses in the nature of lacquer coatings, films, and the like which are stable in use and possess a high degree of elasticity and adhesiveness.

In accordance with this invention superior coating compositions and plastic masses having a cellulosic base, such as a cellulose ether or ester, are provided when such masses incorporate as softening, gelatinizing and solubilizing agents a tetrahydrofurfuryl ester of certain mono-carboxylic acids. The tetrahydrofurfuryl esters include not only those derived from tetrahydrofurfuryl alcohol but also those derived from its homologues, such as those derived from methyl tetrahydrofurfuryl alcohol.

A preferred group of tetrahydrofurfuryl esters are derived from ethers of acetic acid. The ethers of acetic acid may be aliphatic, cycloaliphatic or aryl ethers provided the radical which is joined to the acetyl radical through the ethereal oxygen atom contains at least 6 carbon atoms. Ether mono-carboxylic acids illustrative of those forming suitable tetrahydrofurfuryl esters are: octyl-oxy-acetic acid, cyclohexyl-oxy-acetic acid, phenoxy-acetic acid, cresoxy-acetic acid, octyl-phenoxy-acetic acid, naphthyl-oxy-acetic acid and the like.

In accordance with another embodiment of the invention, wherein the hydrocarbon group of at least 6 carbon atoms contains a cycloaliphatic radical, it is not necessary that this radical be joined to the carboxyl containing group through an ethereal oxygen atom linkage, but it may be directly joined thereto through a carbon to carbon linkage. Such compounds are, for instance, the various substituted and unsubstituted cycloparaffin carboxylic acids, especially the naphthenic carboxylic acids.

The esters of the present invention may be prepared by known methods either by reactions involving the carboxylic acid per se or their esters. For instance, in preparing the tetrahydrofurfuryl esters of ether acetic acids, the ethers are first formed by the reaction of the halogenated acetic acid with aliphatic, cycloaliphatic or aromatic alcoholates. Then tetrahydrofurfuryl alcohol or its homologues are reacted with the ether acids per se or with esters of the ether acids, such as with the butyl ester of an ether acetic acid.

The esters of tetrahydrofurfuryl alcohol and its homologues discussed hereinbefore are highly viscous, almost solid materials and readily dissolve cellulose derivatives, imparting thereto excellent gelatinizing action and a very good plasticity. Lacquers, films or plastic masses prepared with these esters have excellent stability against cold and heat. To suit particular requirements, they may be used jointly with other organic materials, such as, natural or synthetic resins.

The tetrahydrofurfuryl esters of the ether acetic acids represent the preferred ether acids of the instant invention. It is to be understood, however, that esters of the ethers of other lower molecular aliphatic monocarboxylic acids, such as those derived from proprionic or butyric acid, may be used.

The examples which follow hereinafter, in which the parts are by weight, will serve to illustrate the practice of the invention but are not to be considered as a limitation thereon.

Example 1

Twelve parts of acetyl cellulose of medium viscosity are dissolved in 78 parts of a solvent mixture consisting of 20 parts of acetone, 15 parts of methyl alcohol, 15 parts of ethyl acetate, 25 parts of lactic acid ethyl ester, 15 parts of benzol and 10 parts of methyl chloride. Then 12 parts of the tetrahydrofurfuryl ester of cresoxy acetic acid, which is a water-clear fluid having a boiling point of 190° to 200° C. at a pressure of 9 mm. of mercury, are stirred into the previously prepared solution. The resulting composition is a lacquer possessing a high degree of elasticity which can be used to great advantage as coatings in the aviation industry.

Example 2

One hundred and eighty-four parts of nitrocellulose of low viscosity mixed with alcohol in the ratio of 2:1 are dissolved in a solvent mixture consisting of 25 parts of butanol, 125 parts of butyl acetate of 100% purity, 50 parts of lactic acid ethyl ester, 200 parts of toluol and 100 parts of xylol. Then 80 parts of tetrahydrofurfuryl ester of cresoxy acetic acid and 60 parts of linseed oil are blown into the solution. Finally, 60 parts of a pigment paste, for example, cadmium red, together with 15 parts of the tetrahydrofurfuryl ester of cresoxy acetic acid are stirred into the previously prepared solution until it forms a homogeneous mass. A red, thick lacquer of excellent elasticity and adhesiveness is obtained. This lacquer is admirably suited for coating wood, metal, leather and other like materials.

Example 3

Ten parts of benzyl cellulose are dissolved in a solvent mixture consisting of 40 parts of toluol, 10 parts of xylol, 20 parts of tetrahydronaphthaline, 10 parts of alcohol and 7 parts of butanol. Then 3 parts of the tetrahydrofurfuryl ester of octyloxy acetic acid are stirred into the previously prepared solution. The resulting composition is a lacquer giving very resistant and waterproof coatings.

Example 4

Thirty parts of nitrocellulose of low viscosity mixed with alcohol in the ratio of 2:1 are dissolved in a solvent mixture consisting of 20 parts of acetone, 10 parts of methyl acetate, 15 parts of butyl acetate of 100% purity and 10 parts of lactic acid ethyl ester. Then 15 parts of the tetrahydrofurfuryl ester of naphthenyloxy acetic acid are stirred into the previously prepared solution. A lacquer is obtained giving excellent elastic and adhesive coatings.

Example 5

Three parts of nitrocellulose of middle viscosity mixed with alcohol in the ratio of 2:1 are dissolved in a solvent mixture consisting of 6 parts of butyl acetate of 100% purity, 6 parts of butanol, 8 parts of cyclohexyl acetate, 12 parts of toluol and 12 parts of xylol. Then 3 parts of tetrahydrofurfuryl ester of naphthenic acids (middle molecular weight 220) are stirred into the previously prepared solution. An impregnating lacquer is obtained possessing a high degree of elasticity.

It should be understood that the present invention is not limited to the specific esters and compositions herein disclosed but that it extends to all equivalents which one skilled in the art would consider within the general purport of the instant disclosure as limited only by the appended claims.

I claim:

1. A composition of matter suitable for the production of stable plastic masses, coating compositions and the like comprising a cellulosic base selected from a member of the group consisting of cellulose ethers and esters, and as a plasticizing and dissolving agent a tetrahydrofurfuryl ester of an ether of a lower molecular aliphatic mono-carboxylic acid wherein the radical joined to said aliphatic radical through the ethereal oxygen atom contains at least 6 carbon atoms.

2. A plastic mass comprising a cellulosic base selected from a member of the group consisting of cellulose ethers and esters and a tetrahydrofurfuryl ester of an ether of acetic acid wherein the radical joined to said acetic acid radical through the ethereal oxygen atom contains at least 6 carbon atoms.

3. A composition of matter suitable for the production of plastic masses, coating compositions and the like comprising a cellulosic base selected from a member of the group consisting of cellulose ethers and esters and an ester of tetrahydrofurfuryl alcohol with cresoxy acetic acid.

4. A stable composition of matter for the production of plastic masses, coating compositions and the like containing a cellulosic base selected from a member of the group consisting of cellulose ethers and esters and a tetrahydrofurfuryl ester of ether acetic acid wherein the ether radical joined to the acetic acid radical contains an aliphatic hydrocarbon chain of at least 6 carbon atoms.

5. A stable composition of matter for the production of plastic masses, coating compositions and the like containing a cellulosic base selected from a member of the group consisting of cellulose ethers and esters and a tetrahydrofurfuryl ester of ether acetic acid wherein the ether radical joined to the acetic acid radical contains an alicyclic chain of at least 6 carbon atoms.

6. A stable composition of matter for the production of plastic masses, coating compositions and the like containing a cellulosic base selected from a member of the group consisting of cellulose ethers and esters and a tetrahydrofurfuryl ester of octyl-oxy-acetic acid.

7. A stable composition of matter for the production of plastic masses, coating compositions and the like containing a cellulosic base selected from a member of the group consisting of cellulose ethers and esters and a tetrahydrofurfuryl ester of cyclohexyl-oxy-acetic acid.

8. A composition of matter having a cellulose acetate base and containing a tetrahydrofurfuryl alcohol ester of cresoxy acetic acid as a plasticizing agent.

9. A composition of matter having a cellulosic base selected from a member of the group consisting of cellulose esters and ethers and containing as a plasticizing agent a tetrahydrofurfuryl ester of an ether acetic acid wherein the ether radical joined to the acetic acid radical contains an aryl hydrocarbon radical of at least 6 carbon atoms.

RUDOLF ENDRES.